United States Patent [19]

Meyer

[11] 4,362,231

[45] Dec. 7, 1982

[54] CHUTE FOR TRANSPORTING TIMBER

[75] Inventor: Walter Meyer, Liezen, Austria

[73] Assignee: Firma Leykam-Mürztaler Papier und Zellstoff Aktiengesellschaft, Vienna, Austria

[21] Appl. No.: 907,812

[22] Filed: May 18, 1978

Related U.S. Application Data

[63] Continuation of Ser. No. 602,726, Aug. 7, 1975, abandoned.

[51] Int. Cl.³ .............................................. B65G 11/10
[52] U.S. Cl. .................................... 193/2 R; 193/2 A; 193/25 A

[58] Field of Search .................... 193/2 R, 2 A, 25 A, 193/38, 41, 25 R; 285/23, 330, 404; 138/118, 177, DIG. 3, DIG. 7; 214/1 P; 137/316; 405/119; 144/242 R

[56] References Cited

U.S. PATENT DOCUMENTS 3,033,238  5/1962  Kosewicz ............................ 138/141

FOREIGN PATENT DOCUMENTS 1109707  4/1968  United Kingdom .............. 193/2 R

Primary Examiner—Jeffrey V. Nase
Attorney, Agent, or Firm—Kurt Kelman

[57] ABSTRACT

A timber chute for the transportation of corticated timber has smooth and deformable polyethylene walls. This makes the chutes light in weight, easy to handle, and less subject to damage than the prior art chutes.

5 Claims, 4 Drawing Figures

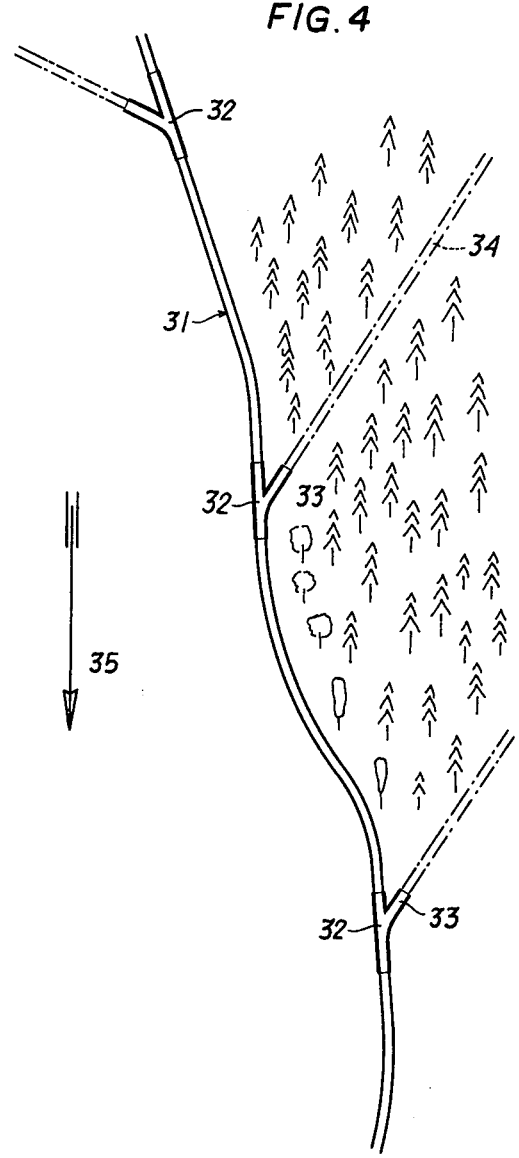

4,362,231

CHUTE FOR TRANSPORTING TIMBER

This is a continuation of application Ser. No. 602,726, filed Aug. 7, 1975, now abandoned.

FIELD OF THE INVENTION

The present invention relates to the transportation of timber and more particularly to timber chutes.

DESCRIPTION OF THE PRIOR ART

Conventional methods applied to the transportation of decorticated timber utilize, for downhill movement, predominantly gravity forces and the slidability of the decorticated trunks along the forest floor and on top of other pieces of timber. This ability to slide was employed in the transportation of timber by means of stationary wooden timber slides which were more or less permanently constructed. In moist weather and on a sufficient grade it was possible to obtain favourable friction values.

In the process of rationalization of forest work, the industry using poor-quality wood resolved to process corticated timber, in order to save the expensive decortication to be carried out in the forest by hand. By eliminating this work, which accounts for 50% of the felling costs, the problem of transporting corticated timber became of pressing importance.

The rough surface of corticated wood reduces, by its greatly increased friction, its slidability factor, even in moist weather, so substantially that the construction of timber slides became obsolete. Corticated wood on top of corticated wood could not be moved. This required resorting to other costly transportation means.

There have been suggestions for metal timber slides, the individual sections of which extend in a straight line and are cut off at their ends which are adapted to intersect at an imaginary distant line. This permits the attaching of trough-like sections forming the slides in such a manner that either a straight trough line is obtained, or the axes of the troughs form the chords of arcs of the trough line. Whenever trough sections of the latter kind are placed, corners will be obtained which cause the trunks, sliding along at considerable speed, to suddenly change direction. This results in an impact, noticeable by a banging and rumbling sound, leading to a deformation of the trough, because a high momentum has to be transferred to the trough wall. This requires an increase in the wall strength of the trough, leading to an intolerable increase in weight. The individual components must be of a construction sufficiently light for permitting their movement in the work area by manpower. This alone will guarantee that the prime demand of speedy assembly or removal can be met.

Moreover, the obliquely cut-off trough or pipe sections known in the art fail to ensure a satisfactory adaptation to the forest floor.

In view of the fact that in the case of thinning of a stand of trees, the timber to be transported is distributed across a wide area, the transporting means requires frequent assembly and removal. Lateral feeding over a wide area has proven uneconomical. The above results in the basic demand for a rather swift assembly of a transporting line. In view of the relatively small quantities of timber which can be transported via an individual line, any costly and thus time-consuming planning and installation work is quite uneconomical.

SUMMARY OF THE INVENTION

The subject matter of the present invention is the provision of a transporting chute which overcomes the shortcomings of known chute systems and meets the aforestated basic requirement.

According to the present invention there is provided a chute for transporting timber, characterized is that it is made from polyethylene.

Chutes of this kind have an excellent elasticity which may be altered by means of the wall thickness selected, without thereby resulting in a substantial increase in weight.

An elasticity of this kind has the further advantage of flexibility of the entire chute system on the ground so much so that in most cases a sufficient adaptation can be achieved without requiring a jointed connection of the individual sections.

Polyethylene in particular is better suited than other plastics, metals, or other materials, because of its particularly smooth surface, its resistance to abrasion, its elasticity, its insensitivity to fluctuations in temperature and because of its relatively low weight.

These favourable characteristics are supplemented by easy handling in the case of damage. Any tools, such as saws, crow-bars, drills and picks required in such a case, are usually available in a forest operation.

The transportation of corticated timber in these chutes is primarily achieved by utilizing the force of gravity. The good slidability of the corticated trunks on the smooth surface of the chute is sufficient for transportation, even at a low incline in the terrain. Moreover, timber can be moved over short distances in a horizontal direction by the use of manpower and a cable line, or in an uphill direction over longer distances by machine power and cable winches.

In view of the smoothness and elasticity of the plastic material used for the chutes, the wood trunks slide along completely free of bumping and almost noiselessly, in spite of their coarse surface. Any impacts are absorbed by the elasticity of the walls of the trough.

The prefabricated chute sections which are reusable over and over, are interconnected by means of easily established and just as easily released locks so as to form units of transporting troughs of any length desired. The economical lengths are between 100 and 500 m.

The sections may be assembled by means of snap locks, for example of the kind of a bayonet lock.

BRIEF DESCRIPTION OF THE DRAWINGS

In the accompanying drawings:

FIG. 4 illustrates an overall assembly of chutes.

DESCRIPTION OF THE PREFERRED EMBODIMENTS

The individual sections of the chute preferably have a length of approximately 4 to 7 m, a width of 30 to 40 cm and a height of 30 to 40 cm. The plastic material from which the sections are made ensures their light weight and the smooth walls permit the sliding of corticated round timber.

The sections may be prefabricated. They may be stored and transported to their location of use in stacked position, or they may be transported in some other fashion. The sections may be reused many times over. Round timber may be transported in these chutes, particularly in the downhill direction, by the effect of gravity, but also in the horizontal direction by manual force and uphill by means of machinery, for example by a cable line.

Figure 1:
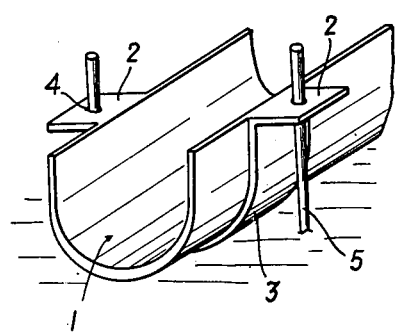
FIGS. 1 and 2 each show a perspective view of a portion of a trough section and its securing either to the ground or to two trees.
Figure 2:
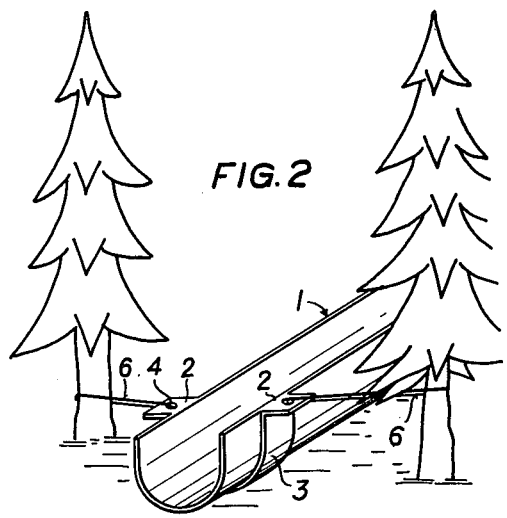

According to FIGS. 1 and 2, a trough 1, being of U-shaped cross-section, is provided with lateral lugs or plates 2 and is reinforced in that area by a rib 3. Apertures 4 in the lugs permit the insertion of steel rods or pipes 5 driven into the ground, as shown in FIG. 1. Alternatively, as shown in FIG. 2, cables 6 may be extended through apertures 4 in lugs 2 and be attached to trees. In conforming to the ground surface, the troughs may be disposed in free hanging fashion, i.e. without ground contact.

Figure 3:
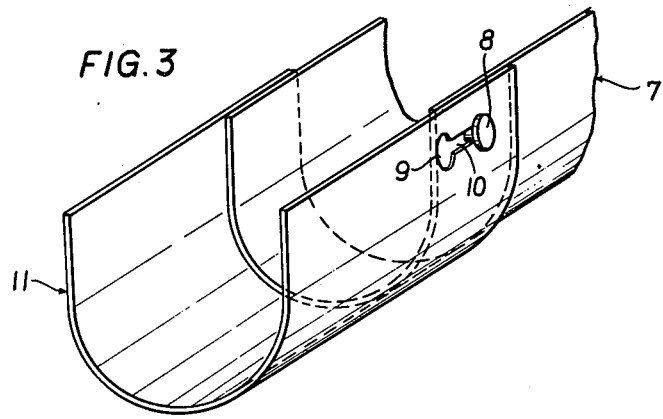
FIG. 3 is a perspective view, illustrating the interlocking of two sections.

FIG. 3 shows an upper trough section 7 which tapers downward and is provided on either side with studs 8, into which the widened portions 9 of slots 10 of a lower section 11 may be inserted. This is feasible due to a sufficient elasticity. The lower section may then be pulled downward sufficiently for engaging studs 8 in slots 10, as shown in FIG. 3. This provides a speedily engagable and just as speedily disengagable locking connection between two through sections.

A connection of this kind further permits the averaging out of minor irregularities in the ground surface by pivoting the lower trough section 11 about studs 8 either upward or downward, as required. Small changes in direction are also possible so that, in plan view, the longitudinal axes of the troughs include an angle. Major changes in lateral direction can be accomplished by the insertion of slightly curved trough sections.

In the case of laying a chute line transverse to a hillside, the sliding troughs may be adapted to the angle of gradient of the terrain by positioning the troughs movably in their portions intended for insertion.

FIG. 4 shows the installation of troughs, in a wooded area. Depicted are a main line 31, composed of a plurality of trough, or pipe sections and, joined thereto, sections 32 with lateral pipe studs 33. Lateral sections may be provided at intervals of approximately 60 to 70 m. To these sections, serving for charging of timber to the main line, are connected feeding troughs 34 constructed from particularly light sections adapted to be telescopically extendable to a length of approximately 20 m and easily carried by one man. According to this Figure, the terrain is assumed to be sloping downward in the direction of the arrow.

I claim:

1. A chute for transporting timber by gravity, comprising interconnected trough-shaped chute sections of polyethylene, the chute sections defining a concavity capable of receiving the timber and having smooth and elastically deformable polyethylene walls supporting the timber.

2. The chute of claim 1, wherein the interconnected polyethylene chute sections are positioned on the ground.

3. The chute of claim 1, wherein each of the chute sections has a length of approximately 4 to 7 m, a width of approximately 30 to 40 cm, and a height of approximately 30 to 40 cm.

4. The chute of claim 1, wherein the polyethylene walls have a thickness selected to retain elasticity while being resistant to breaking under impact forces of the timber transported through the chute sections by gravity.

5. A method of transporting timber by gravity over sloping terrain, comprising the steps of
    (a) providing a plurality of trough-shaped chute sections of polyethylene, each of the chute sections defining a concavity capable of receiving the timber and having smooth and elastically deformable polyethylene walls supporting the timber,
    (b) assembling the chute sections into a continuous trough,
    (c) securing the continuous trough to the sloping terrain, and
    (d) placing the timber into the trough for sliding therealong by gravity.

* * * * *